July 6, 1937.  R. O. HULL  2,085,754
ADDITION AGENTS FOR NICKEL PLATING
Filed July 30, 1934
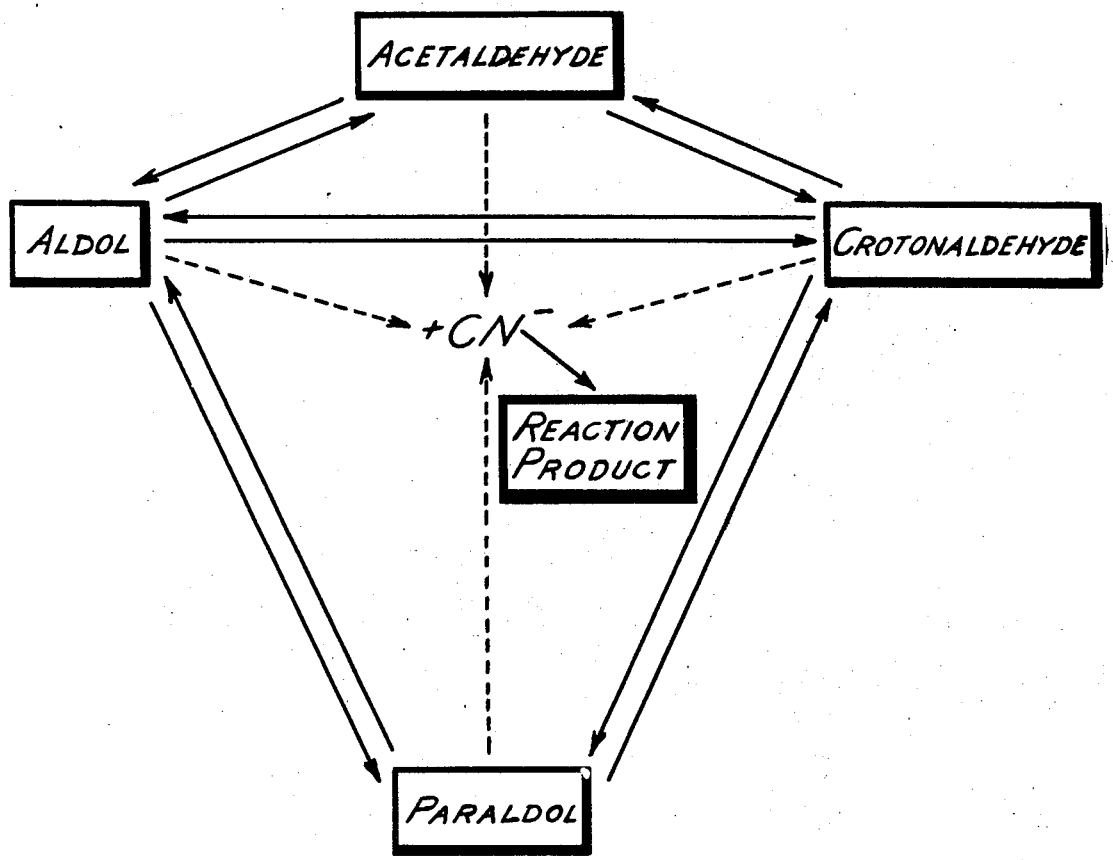
INVENTOR.
RICHARD O. HULL
BY
Albert B. Griggs.
ATTORNEY.

Patented July 6, 1937

2,085,754

UNITED STATES PATENT OFFICE 2,085,754

ADDITION AGENTS FOR NICKEL PLATING

Richard O. Hull, Lakewood, Ohio, assignor, by mesne assignments, to E. I. du Pont de Nemours & Company, Wilmington, Del., a corporation of Delaware Application July 30, 1934, Serial No. 737,494

17 Claims. (Cl. 204—14)

This invention relates to nickel plating and is particularly directed to certain novel addition agents for use in nickel plating, to processes employing them, and to nickel plating baths containing them.

My novel addition agents are reaction products of alkali metal cyanides with organic compounds which contain a carbonyl, C=O, group. The organic compounds characterized by the presence of a carbonyl group are aldehydes or ketones. It is believed that on treatment with a cyanide the aldehydes and ketones undergo some change. The change, in some cases, may be simply a conversion to the enol form, but the experimental evidence available indicates that, at least in certain cases, there is a reaction between the aldehyde or ketone and the cyanide. It may be that in other cases the aldehyde or ketone condenses in the presence of the cyanide, but without a definite reaction therewith. The experimental difficulties involved in determining exactly what takes place are very great as most of the products resulting from treatment with cyanide are somewhat unstable and are very complex. I shall, accordingly, designate the change, of whatever nature, a reaction, and I shall term the changed products alkali metal cyanide reaction products.

As examples of aldehydes and ketones the cyanide reaction products of which I have found effective as addition agents, I list the following. The agents are listed in the approximate order of their desirability as starting materials, ketones and aldehydes being listed separately:

*Aldehydes*

1. Aldol
2. Acetaldehyde
3. Crotonaldehyde
4. Paraldol
5. Propionaldehyde
6. α ethyl β propyl acrolein
7. Butyraldehyde
8. Acrolein
9. Citral
10. Citronellal
11. Hexadecoic aldehyde
12. Isobutylaldehyde

*Ketones*

1. Diethyl ketone
2. Methyl n-propyl ketone
3. Methyl ethyl ketone
4. Diacetyl
5. Light acetone oil
6. Heavy acetone oil
7. Isobutyl ketone
8. Acetone
9. Iso amyl ketone The best results have been obtained with cyanide reaction products of one group of aldehydes, the aldacets, and I will first discuss addition agents derived from members of this group.

A novel, and valuable, addition agent for nickel may be obtained by treating an aldacet such as, acetaldehyde, aldol, crotonaldehyde, paraldol, etc., with an alkali metal cyanide solution. This reaction product is preferably treated with dilute sulfuric acid to neutralize the solution. A viscous liquid, dark red in color, rises to the top and may be separated from the remainder of the solution. This material constitutes my preferred product.

The materials acetaldehyde, aldol, crotonaldehyde, and paraldol above mentioned represent my preferred starting materials. At first glance these substances may not appear to belong in the same chemical genus, but, in fact, they are very closely related chemically for in cyanide solution each may reversibly be converted to another. Acetaldehyde in dilute alkali metal cyanide solution quickly changes to aldol, thus:

(1) 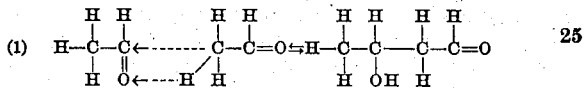

The aldol may lose one molecule of water and become croton aldehyde, thus:

(2) 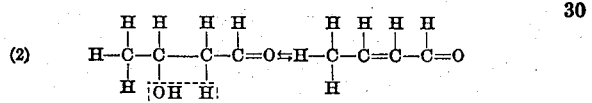

The aldol may condense to form paraldol, thus:

(3) 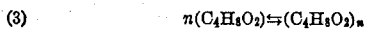

The $n$ in Equation 3 is a whole number, probably 2.

In order to visualize the relationship existing between the listed materials, reference should be had to the accompanying drawing wherein their relationships are diagrammatically illustrated. It will be understood that the relationships are shown with reference to the compounds in dilute alkali metal cyanide solutions.

In the drawing acetaldehyde is illustrated as converting to aldol. The aldol may go to paraldol or to crotonaldehyde. The aldol might also go back to acetaldehyde, but only to a small extent. The paraldol may go back to aldol, or it may lose water and go to crotonaldehyde, though this latter conversion probably takes place to a very small degree. The crotonaldehyde may form from acetaldehyde, aldol, or paraldol, and, by gaining water, may revert to any of them, though it is likely that it would move largely by way of aldol.

As seen in the drawing, we may consider the acetaldehyde, aldol, crotonaldehyde, and paraldol as being in some kind of equilibrium. This equilibrium will, according to my belief, be substantially the same regardless of which of the four substances are added initially to the cyanide solution.

The reaction which leads to my preferred products takes place, I believe, between CN⁻ and one or more of the four materials to produce a reaction product. This is illustrated in the drawing by dashed lines. The material, or materials, which act with the cyanide may go first to some other and unknown form and then react. In any event, I conceive of the reaction as withdrawing one, or more, of the four materials from the equilibrium with the result that the remaining materials move towards the removed materials to restore the equilibrium and are so all finally utilized.

I have reason to believe that two or more of the materials in equilibrium react with cyanide to produce the final product, or else the one which reacts with the cyanide moves through a number of different paths to produce a number of final products. This is evidenced by the fact that the reaction product is a mixture of separable materials. More is said of this separability hereinafter.

I have mentioned only acetaldehyde, aldol, crotonaldehyde and paraldol as members of this sub-genus, but obviously I may use any condensation product of acetaldehyde in dilute alkali metal cyanide solution. Another member of this genus is paraldehyde. Ordinarily paraldehyde is considered as forming only in acid solution, but I have reason to believe that at least some paraldehyde forms in the discussed equilibrium. Paraldehyde is very slow to convert to other members of this genus and because of this fact is none too satisfactory a starting material. The term "condensation product" is used to refer to the products which form from acetaldehyde in cyanide solution without a true reaction with the cyanide. Aldol, acetaldehyde crotonaldehyde, and paraldol are the only commercially available members of this sub-genus at the present time. For practical reasons, therefore, I prefer to use as a starting material an aldehyde selected from the group consisting of acetaldehyde, aldol, crotonaldehyde, and paraldol.

Broadly, I use as a starting material an aldehyde from the group consisting of acetaldehyde and its condensation products in alkali metal cyanide solution. This expression of this sub-genus of aldehydes is more aptly put: an acetaldehyde condensation product in alkali metal cyanide solution. This generic expression includes acetaldehyde, aldol, crotonaldehyde, paraldol, and other such products, since, as above discussed, some or all of these form when acetaldehyde is put in cyanide solution. This genus of aldehydes has been named "aldacet". The aldacets include acetaldehyde, aldol, crotonaldehyde, paraldol, and the other products which form in alkali metal cyanide solutions by condensation of acetaldehyde as above fully described.

It will be noted hereinafter that the starting materials are not entirely equivalent, but are substantially so. Crotonaldehyde, for example, seems to lead to slightly lower yields. This may be attributable to the fact that crotonaldehyde is but slowly converted to the necessary form, or to some other, now unknown, cause.

As is above indicated, there is considerable uncertainty as to the extent and nature of the conversion of some aldacets to others. All of the evidence now available to me substantiates the putative theory above mentioned as to the nature of the aldacet equilibrium, but it will be understood that direct experimental evidence is obtainable only with great difficulty. In most instances the aldacet equilibrium exists for only a short time, going quickly to the cyanide reaction product, and it is, therefore, very difficult to determine, quantitatively, the conditions which obtain. The fact that the aldacets are in some kind of equilibrium is relatively certain, but the proportions of individual aldacets and the rate of conversion has, to date, defied exact determination.

It is to be clearly understood that the above description of the relation between the initial materials is for purposes of illustration, and I do not intend to be limited in any way thereby because the chemistry of these compounds is intricate and obscure and because my results are obtained entirely apart from theoretical considerations. It is also to be understood that while I refer to aldol, crotonaldehyde, etc. as resulting from the condensation of acetaldehyde in cyanide solution, I do not wish to be limited thereby, as I may use aldol, crotonaldehyde, etc., which have been made by any process.

Turning now to the consideration of the products formed by the reaction of the above discussed starting materials with a cyanide, it is first noted that the term "reaction" is selected to express whatever occurs in the treatment of the starting materials with cyanide under the conditions to be discussed hereinafter. The term "reaction" is used to distinguish from "condensation" as used above, though, in fact, the "reaction" may include both polymerizations and condensations.

The reaction products of my invention contain nitrogen, as determined by the Kjeldahl method, in about the ratio of one nitrogen atom to each two molecules of aldol. (Four of acetaldehyde, one of paraldol, etc.). This nitrogen is probably attached to a carbon group which in turn is attached to a carbon group, C—CN, but insufficient evidence is available to assure the presence of a CN⁻ group.

My products are not simple compounds, but are mixtures, as is evidenced by the fact that portions are water soluble, other portions chloroform soluble, etc. It seems probable that my products are the result of many intricate polymerizations, condensations, and reactions with cyanide. There may be some condensation products which are not combined with nitrogen, but the fact that molecular proportions, or an excess, of alkali metal cyanide to aldehyde give the best results leads to the belief that the amount of such uncombined products is relatively small. I shall refer to the product of these condensations, polymerizations, and reactions as cyanide reaction products.

The aldacets and their reaction products with cyanide are very closely related in their physical and chemical properties, varying much after the manner of an homologous series. The name "cyaldacet" has been conferred upon the genus which includes acetaldehyde and its condensation products in alkali metal cyanide solutions, and the reaction products of acetaldehyde and such condensation products with alkali metal cyanide solutions. In other words, the cyaldacets include the aldacets and alkali metal cyanide reaction products of the aldacets. The drawing clearly shows the relationships among the cyaldacets broadly. The aldacets probably move through higher aldacets and then react with CN⁻. The whole group shown in the drawing, including the aldacets, comprises the genus cyaldacet.

I do not intend, of course, to be in any way limited by the above conjectures as to the nature of the reaction and the nature of the products.

The nature of the addition agents for nickel which are made from aldacets may be best appreciated by a consideration of the following specific example showing one mode of preparation wherein aldol is employed.

*Example 1.*—Five parts, by weight, of technical aldol were added to a solution containing three parts, by weight, of sodium cyanide in ten parts, by weight, of water. The reaction receptacle, to which the aldol was added, was provided with a water cooling means, and conventional means were provided for heating the receptacle as required. By adding the aldol slowly and employing the cooling means, the temperature of the reaction mixture was held between 45° to 50° C. This temperature was maintained for about two and one-half hours, cooling or heating the receptacle as required. As the aldol was added, and for a time thereafter, the heat of the reaction necessitated a continuous cooling of the reaction mixture to hold the temperature within the desired limits. Later it became necessary to supply heat to the reaction mixture to maintain the temperature. During the reaction a small amount of ammonia was liberated as was evidenced by the characteristic odor. The product obtained was a thick, mobile, liquid, dark red in color.

This product may be used directly as an addition agent, but to purify and concentrate it, the product, after cooling, was made neutral to litmus with a dilute solution of sulfuric acid. This acid solution consisted of one part by volume of water to one part by volume of concentrated sulfuric acid. There was then added an excess of ten per cent over the volume of dilute acid required to neutralize the solution. Sodium sulfate was precipitated, and the excess acid used depressed its solubility. The temperature was not allowed to go above 50° C. during this neutralization treatment. Hydrocyanic acid gas was evolved during the treatment and means were provided for disposing of it.

The acid treated solution was allowed to stand for several hours and a dark red fraction rose to the top. This top layer was removed and centrifuged.

The separated top layer, which constitutes my preferred addition agent for nickel, is a viscous liquid, dark red in color, and it has a specific gravity of about 1.20. At temperatures as low as −17° C. it remains liquid, but at the temperature produced with a freezing mixture of solid carbon dioxide and acetone (below −80° C.) a brittle solid, apparently non-crystalline, is formed. My addition agent is substantially insoluble in such solvents as ether, benzene, and petroleum ether. A part of the product is soluble in water, and a small part is chloroform soluble. It is, however, completely soluble in alcohol and acetone.

Both the final product and the unseparated reaction mixture, as obtained above, are characterized by the property of promoting a bright, adherent deposit of nickel. This characteristic serves admirably for the identification of these novel addition agents.

The temperature of the reaction is relatively important as the yield of the product and its activity as an addition agent seem to be greatly influenced thereby. The best results seem to be obtained with temperatures between 45 and 50° C. as used in Example 1. Lower temperatures may be used with a decrease in the activity of the product as an addition agent. Below about 30° C. the product rapidly becomes less active with decreases in temperature. If temperatures substantially above 50° C. are used, the yield of active material is smaller. At about 75° C., for instance, about half of the product is an insoluble resin without much value as an addition agent. Generally, I may use temperatures from about 30° C. to about 75° C. though specifically I prefer to keep the reaction temperature between about 45° and 50° C. The separation by neutralization with acid was accomplished at 50° C., but rigid temperature control is not necessary. Apparently, as soon as the reaction is complete, the reaction product may be heated to rather high temperatures without substantial damage resulting.

In the examples, sulfuric acid is employed for removing excess sodium cyanide by converting it to sodium sulfate which can then be salted out. Obviously other acids can be used which lead to a similar result, and moreover, still other means for removing the excess sodium cyanide will readily occur to those working in the art.

While I may use any of the aldacets as a starting material, I prefer to use aldol as it is readily obtainable commercially at the present time and as it leads to somewhat higher yields than do some of the other aldacets, crotonaldehyde and paraldehyde, for instance. Aldol is also advantageous by reason of its being less volatile than acetaldehyde and more easily handled than paraldol which is a solid.

As an example of the use of another aldacet I give the following:

*Example 2.*—80 parts by weight of acetaldehyde was added slowly to 100 parts by weight of water containing 20 parts by weight of sodium cyanide. The temperature was held between 40° and 50° C. for about one-half hour, at the end of which time the product was allowed to cool.

This solution constitutes an addition agent, for nickel, of my invention.

The reaction mixture is preferably concentrated by treatment with dilute sulfuric acid as described in Example 1. The product is substantially identical with the concentrated product of Example 1, described in detail above.

It is noted that in Example 2 a smaller ratio of cyanide to aldehyde was used than in Example 1. This seems to lower the yield of active material somewhat. Generally, the best results are obtained when the aldehyde and cyanide are used in substantially molecular proportions, but a latitude is permissible. If less of the alkali metal cyanide be used, the product will be less active, while if an excess of alkali metal cyanide be used, no particular damage results. When the product is concentrated by neutralizing with dilute sulfuric acid, the excess cyanide, over that required to form the reaction product, is converted to alkali sulfate and hydrocyanic gas, both of which are separated from the product.

The period of time during which the reaction temperature is maintained may be widely varied. If the time be too short, the reaction will not be complete and the product will be of low activity when used as an addition agent for nickel plating. The time of Example 2 represents a practical minimum and I usually prefer a longer period. In general the reaction temperature should be maintained for not less than one-half hour, and specifically I prefer to maintain it for not less than four hours.

The aldehydes, other than the aldacets, and the ketones, above listed, may be treated in substantially the same way, and under the same conditions, as are the aldacets. The resulting products constitute valuable addition agents for nickel plating.

Continuing, now, with a consideration of the remaining aldehydes and ketones, I first give a few typical examples illustrating the preparation of further addition agents.

*Example 3.*—Five parts by weight of propionaldehyde were mixed with three parts by weight of sodium cyanide and ten parts by weight of water. The mixture was maintained at a temperature of about 50° C. for two hours and then allowed to cool. There was an apparent change in the appearance of the mixture during the reaction period. The reaction product was a homogeneous, mobile liquid, light yellow in color. This reaction mixture constitutes an addition agent for nickel of my invention.

*Example 4.*—Diethyl ketone was treated according to the method of Example 3, and the product permitted to stand a few days. The reaction mixture separated into two layers, a light-yellow upper layer, and a colorless lower layer which is probably sodium cyanide solution. While I may use both layers mixed together as an addition agent, I prefer to separate, and use, the upper layer.

*Example 5.*—Methyl ethyl ketone was treated according to the process of Example 3, and then allowed to stand a few days. The reaction mixture separated into a lower, light yellow layer, and a small upper layer, dark red in color. Again I may use the mixture, but I prefer to use the upper layer.

*Example 6.*—Diacetyl was treated as in Example 3 and a homogeneous liquid was obtained.

*Example 7.*—Methyl n-propyl ketone was treated as in Example 5. A colorless upper layer and a colorless lower layer were obtained. Again I may use the reaction mixture, but I prefer to use the upper layer.

*Example 8.*—Acetone was treated according to the process of Example 5. After standing three weeks a light red lower layer and a dark red upper layer formed. I may use the mixture as an addition agent, but I prefer to merchandise the upper layer separately.

*Example 9.*—Butyraldehyde was treated according to the process of Example 5. The two layers which formed are both active as addition agents and I may use either or the mixture. As will appear hereinafter, the upper layer is the more effective.

*Example 10.*—Hexadecoic aldehyde was treated according to the process of Example 3, the mixture of aldehyde and cyanide being maintained at about 50° C. for four hours. The reaction mixture was allowed to stand over night and was found to have separated with a top layer of nearly black cyanide reaction product. It is noted that the original aldehyde was light yellow in color.

The conditions as to the temperature and time of reaction, as to the relative quantities of reactants, and as to the procedure generally follow closely the corresponding conditions as fully explained above in connection with the cyaldacets.

The aliphatic aldehydes and ketones above discussed are compounds of at least two carbon atoms which contain a carbonyl group. I limit myself, as to starting materials, to compounds of at least two carbon atoms, because formaldehyde, with only one carbon atom, does not operate, though it does contain a carbonyl group. With the single exception of formaldehyde it appears that it is the presence of a carbonyl group which determines the applicability of aliphatic compounds to my purposes.

As the starting materials contain more and more carbon atoms they appear to become less desirable. Citral and citronellal, for example, with nine carbon atoms form with cyanide quite satisfactory addition agents, but they tend to emulsify. Above about nine carbon atoms, the compounds become even less desirable. Hexadecoic aldehyde, for instance, with sixteen carbon atoms, proved none too satisfactory as an addition agent when the preformed cyanide reaction product was used. I prefer, accordingly, to use aliphatic compounds between two and nine carbon atoms which contain a carbonyl group. This terminology includes acetaldehyde, for example, as a two carbon compound and citral as a nine carbon compound.

I especially prefer to use aliphatic compounds of two to nine carbon atoms which contain a carbonyl group and which contain no more than two hydroxyl groups. These expressions, of course, include compounds with more than one carbonyl group. I have found that the presence of a carboxyl group is not particularly desirable. The element sulfur is preferably absent from cyanide reaction compounds which I use as addition agents, as my empirical results tend to show that some sulfur containing compounds which fall within my broad definition are likely to cause a staining or discoloration of the work. I also prefer to employ compounds conforming to the above definition which do not contain nitrogen. I especially prefer to use as a starting material a compound which conforms to the above definitions and which contain only carbon, hydrogen and oxygen.

The above may be expressed in some of its specific aspects by the following:

$$C_nH_xO_{n-(1+y)}$$

wherein $n$ equals two or more, tho preferably no more than nine; wherein $x$ is two or more; wherein $y$ is a positive whole number except in the special case $n=2$ when $y=0$; wherein $n-(1+y)$ is one or more, but is less than $x/2$; and wherein at least one oxygen is joined to carbon by a double bond.

As is noted earlier my novel addition agents are reaction products of alkali metal cyanides with organic compounds which contain the carbonyl, C=O, group. In addition to aliphatic aldehydes and ketones, carbocyclic compounds may be treated with cyanide to form addition agents for nickel. As is stated above, I do not know exactly the nature of the change that occurs when carbocyclic compounds are treated with cyanide. In the case of benzaldehyde the first change is probably a conversion to benzoin, but the next change may be a further condensation, a true reaction with cyanide, or perhaps both. With some carbocyclic compounds the change may be merely to the enol form, tho more often, I believe, there is some type of condensation and/or true reaction with the cyanide. Following the terminology used above with reference to cyanide-treated aliphatic compounds, I will refer to the changed products, of whatever nature, as reaction products, and I will refer to the change as a reaction.

The following materials are listed as examples of carbocyclic compounds which have been reacted with cyanide to form addition agents. The compounds are listed in approximately the order of their value as starting materials, those at the top of the list being quite effective, and those at the bottom being none too satisfactory:

1. Cyclohexanone
2. Methyl cyclohexanone
3. Benzoin
4. Benzaldehyde
5. Anisic aldehyde
6. Cinnamic aldehyde
7. Quinone
8. Vanillin
9. Ortho-ortho dicarboxy benzoin The carbocyclic compounds were treated in the same general way as were the aliphatic aldehydes and ketones. The following brief examples will more fully illustrate the preparation of addition agents for nickel from carbocyclic compounds.

*Example 11.*—Benzaldehyde was treated at 50° C. for several hours with an excess of sodium cyanide solution. The cyanide solution contained three parts by weight of sodium cyanide to ten parts by weight of water. As the benzaldehyde was added to the cyanide solution, a precipitate of some relatively insoluble material formed. After a few hours most of this precipitate had dissolved. The reaction mixture was employed quite successfully as an addition agent for nickel.

As benzaldehyde is known to form benzoin in alkaline solution, I believe that the precipitate noted above was benzoin, and that on further treatment at 50° C. some further change took place which resulted in the formation of a more soluble compound. The benzoin may have reacted with cyanide, condensed further, or perhaps both.

*Example 12.*—Benzoin was treated as in Example 11, and after some time a satisfactory addition agent was obtained. By dissolving the benzoin in alcohol and then treating the alcohol solution with cyanide, the final product was made more quickly. In the latter procedure the alcohol was removed from the product by distillation.

*Example 13.*—As benzaldehyde and benzoin are difficultly soluble, I added two carboxyl groups to benzoin to form ortho-ortho dicarboxy benzoin which was much more soluble than benzoin. The cyanide reaction product of this material was none too satisfactory as an addition agent.

The other carbocyclic compounds above listed may be pretreated with cyanide according to the procedure above given with good results. It is noted here that instead of using methyl cyclohexanone, I may use other alkyl substituents in lieu of the methyl group. I may, of course, use more than one alkyl substituent.

While broadly I may use as a starting material to be reacted with cyanide any carbocyclic compound which contains at least one carbonyl group, I prefer to use compounds which do not contain a carboxyl group and which do not contain sulfur. I also prefer to employ compounds, as starting materials, which do not contain nitrogen. Michler's ketone, for instance, responds to my broadest definition but it yields none too satisfactory an addition agent. More specifically I prefer to employ compounds which contain only carbon, hydrogen, and oxygen as starting materials from which to make cyanide reaction products.

While I have usually referred to specific compounds above, it will be readily understood that I may employ mixtures of compounds or products of technical grade.

As has been seen above, my novel addition agents for nickel plating are comprised of cyanide reaction products of organic compounds which contain a carbonyl group and which have two or more carbon atoms. It has also been seen that my novel addition agents are, more specifically, comprised of cyanide reaction products of organic compounds that contain a carbonyl group, that contain two or more carbon atoms, that do not contain sulfur, that do not contain nitrogen, and that do not contain a carboxyl group. Further, it has been seen that I prefer organic compounds which contain only carbon, hydrogen, and oxygen.

It has further been seen that, in one broad aspect of this invention, my novel addition agents are comprised of cyanide reaction products of one species of organic compound which contains a carbonyl group, namely: aliphatic aldehydes and ketones. The aliphatic aldehydes and ketones employed as starting materials preferably contain between two and nine carbon atoms. More specifically, these carbonyl-group-containing aliphatic compounds should not contain a carboxyl group, should not contain nitrogen, should not contain sulfur, and should not contain more than two hydroxyl groups.

I prefer to employ aliphatic compounds that contain only carbon, hydrogen, and oxygen. It has also been seen that, rather specifically expressed, my starting materials may be designated by the formula:

$$C_nH_xO_{n-(1+y)}$$

wherein $n$ equals two or more, tho preferably no more than nine; wherein $x$ is two or more; wherein $y$ is a positive whole number except in the special case $y=0$ when $x=2$; wherein $n-(1+y)$ is one or more, but is less than $x/2$; and wherein at least one oxygen is joined to carbon by a double bond. It will also be apparent that the cyanide reaction products of the aldacets constitute my preferred addition agents, and that, more specifically, I prefer to use as a starting material an aldacet selected from the group consisting of acetaldehyde, aldol, crotonaldehyde and paraldol.

It has further been seen that in another aspect of this invention, my novel addition agents are comprised of cyanide reaction products of another species of organic compound which contains a carbonyl group, namely: carbocyclic aldehydes and ketones. The carbocyclic aldehydes and ketones employed as starting materials, specifically speaking, should not contain sulfur, should not contain nitrogen, and should not contain a carboxyl group. More specifically, the aldehydes and ketones should contain only carbon, hydrogen, and oxygen. It will be apparent that the empirical formula;

$$C_nH_xO_{n-(1+y)}$$

will cover carbocyclic aldehydes and ketones. When $n$ equals a relatively large number such as six, seven, fourteen, etc., this is especially true.

In view of the fact that there is no term which designates the C=O group as it appears in aldehydes and ketones, in contradistinction to the C=O group as it appears in acids, etc., I have used carbonyl group in this limited sense. The C=O group appears in acids,

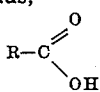

as well as in aldehydes and ketones, but I do not intend the term "carbonyl group" to include the C=O group of acids. Strictly, the "carbonyl group" as referred to herein might more accurately be designated a carbonyl group in which a third carbon valence is joined to carbon and in which the remaining valence is satisfied by carbon or by hydrogen. Or, in chemical symbols, the "carbonyl group" as referred to herein is of the type

wherein R is a hydrocarbon radical and wherein R' is hydrogen, in the case of an aldehyde, or R' is a hydrocarbon radical, in the case of a ketone. It is believed that the simple expression "a carbonyl group", as applied to one or more aldehydic or ketonic C=O groups, both simplifies and clarifies the specification and claims, but the expression must be understood, in every use, to designate C=O groups of the kind above described.

While the term "aldacet" is fully defined above, for purposes of more precise definition it is noted that the aldacets are the equilibrium products which result when acetaldehyde is put in alkaline solution in contradistinction to the irreversible condensation or polymerization products which result, all as set forth above.

As an example of the use of my novel addition agents I give the following:

Example 14

A nickel plating bath of the following composition was used:

| | Grams per liter |
|---|---|
| Nickel sulfate (NiSO$_4$·6H$_2$O) | 95 |
| Nickel chloride (NiCl$_2$·6H$_2$O) | 15 |
| Boric acid | 15 |
| Ammonium chloride | 15 |
| pH (colorimetric) 5.9 | |

Recessed cathodes, one-tenth of a square foot in area, were each plated for ten minutes at a current density of fifteen amperes per square foot. Various amounts of the concentrated addition agent of Example 1 were successively added to the bath, and the effect on the nickel deposit noted first at a plating temperature of twenty-two degrees and then at a plating temperature of thirty-seven degrees centigrade. The bright range of the addition agent, under the above conditions, was found to be about twenty-five hundredths gram to five grams per liter. A very bright deposit was obtained with one to three grams per liter of addition agent.

The addition agent promoted the formation of a bright, ductile deposit which adhered well to the base metal. The results obtained were in striking contrast with the fairly bright but brittle deposits which result when such prior art addition agents as cadmium, zinc, lactate, glucose, and hydrogen peroxide were used. It will also be noted that my addition agent has a much wider range of effectiveness than have the agents heretofore known.

The various other addition agents above mentioned may be used in the acid-nickel bath above given with good results. They may, obviously, be used in other nickel plating baths than that above described.

In order conveniently to merchandise my novel addition agents, I may incorporate them with the dry ingredients employed to make up a plating bath. The resulting dry mixture can be packaged and sold to the consumer who needs only to dissolve the mixture in water for use. Again, I may find it desirable to incorporate the addition agent with only one or a few of the ingredients and let the consumer add the other ingredients. Frequently, of course, it will be desirable to merchandise the novel addition agent as such.

I do not intend to be limited to the illustrative conditions and examples above given, the scope of my invention being set forth in the appended claims.

I claim:

1. A nickel sulfate plating composition containing a reaction product with an alkali metal cyanide of an organic compound which has no less than two carbon atoms and which contains a carbonyl group.

2. A nickel sulfate plating composition containing a reaction product with an alkali metal cyanide of an organic compound that contains a carbonyl group, that has no less than two carbon atoms, that does not contain sulfur, that does not contain nitrogen, and that does not contain a carboxyl group.

3. A nickel sulfate plating composition containing a reaction product with an alkali metal cyanide of a carbocyclic compound that contains a carbonyl group.

4. A nickel sulfate plating composition containing a reaction product with an alkali metal cyanide of a carbocyclic compound that contains a carbonyl group, that does not contain sulfur, that does not contain nitrogen, and that does not contain a carboxyl group.

5. A nickel sulfate plating composition containing a reaction product with an alkali metal cyanide of an aliphatic compound that contains a carbonyl group and that contains no less than two carbon atoms.

6. A nickel sulfate plating composition containing a reaction product with an alkali metal cyanide of an aliphatic compound that contains a carbonyl group, that contains no less than two carbon atoms, that has no more than two hydroxyl groups, that does not contain nitrogen, that does not contain sulfur, and that does not contain a carboxyl group.

7. A nickel sulfate plating composition containing a reaction product of an aldacet with an alkali metal cyanide an aldacet being, as herein set forth, one of the aldehyde equilibrium products, which result when acetaldehyde is put in alkali metal cyanide solution.

8. A nickel sulfate plating composition containing a reaction product of an alkali metal cyanide with an aldehyde selected from the group consisting of acetaldehyde, aldol, crotonaldehyde, and paraldol.

9. A nickel sulfate plating composition containing a reaction product of aldol with an alkali metal cyanide.

10. A nickel sulfate plating composition containing a nitrogen derivative of an aldacet, the derivative being a dark red, viscous liquid with a specific gravity of about 1.2, a solidifying temperature below −17° C., being soluble in alcohol and acetone, insoluble in ether, benzene, and petroleum ether, and partially soluble in chloroform and water an aldacet being, as herein set forth, one of the aldehyde equilibrium products, which result when acetaldehyde is put in alkali metal cyanide solution.

11. In a process for the electrodeposition of nickel, the step comprising depositing nickel from a sulfate solution in the presence of a reaction product of an alkali metal cyanide with an organic compound which has no less than two carbon atoms, and which contains a carbonyl group.

12. In a process for the electrodeposition of nickel, the step comprising depositing nickel from a sulfate solution in the presence of a reaction product of an alkali metal cyanide with an organic compound that contains a carbonyl group, that has no less than two carbon atoms, that does not contain sulfur, that does not contain nitrogen, and that does not contain a carboxyl group.

13. In a process for the electrodeposition of nickel, the step comprising depositing nickel from a sulfate solution in the presence of a reaction product of an alkali metal cyanide with a carbocyclic compound that contains a carbonyl group.

14. In a process for the electrodeposition of nickel, the step comprising depositing nickel from a sulfate solution in the presence of a reaction product of an alkali metal cyanide with an aliphatic compound that contains a carbonyl group and that contains no less than two carbon atoms.

15. In a process for the electrodeposition of nickel, the step comprising depositing nickel from a sulfate solution in the presence of a reaction product of an alkali metal cyanide with an aldacet an aldacet being, as herein set forth, one of the aldehyde equilibrium products, which result when acetaldehyde is put in alkali metal cyanide solution.

16. In a process for the electrodeposition of nickel, the step comprising depositing nickel from a sulfate solution in the presence of a reaction product of an alkali metal cyanide with aldol.

17. In a process for the electrodeposition of nickel, the step comprising depositing nickel from a sulfate solution in the presence of a nitrogen derivative of an aldacet, the derivative being a dark red, viscous liquid with a specific gravity of about 1.2, a solidifying temperature below —17° C., and being soluble in alcohol and acetone, insoluble in ether, benzene, petroleum ether, and partially soluble in chloroform and water an aldacet being, as herein set forth, one of the aldehyde equilibrium products, which result when acetaldehyde is put in alkali metal cyanide solution.

RICHARD O. HULL.